(12) United States Patent
Alanen et al.

(10) Patent No.: US 7,893,870 B2
(45) Date of Patent: Feb. 22, 2011

(54) GPS DEVICE

(75) Inventors: Kimmo Alanen, Lempaala (FI); Jari Syrjarinne, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/596,823

(22) PCT Filed: May 20, 2005

(86) PCT No.: PCT/IB2005/001926

§ 371 (c)(1),
(2), (4) Date: Nov. 16, 2006

(87) PCT Pub. No.: WO2005/114249

PCT Pub. Date: Dec. 1, 2005

(65) Prior Publication Data

US 2007/0247358 A1    Oct. 25, 2007

(30) Foreign Application Priority Data

May 21, 2004    (GB) ................................ 0411394.0

(51) Int. Cl.
*G01S 19/33* (2010.01)
(52) U.S. Cl. ................................ 342/357.73
(58) Field of Classification Search ..................
342/357.01–357.17, 357.72–357.73
See application file for complete search history.

(56) References Cited

U.S. PATENT DOCUMENTS

| | | | |
|---|---|---|---|
| 5,884,214 A | 3/1999 | Krasner | |
| 6,075,987 A | 6/2000 | Camp, Jr. et al. | |
| 6,300,899 B1 * | 10/2001 | King | 342/357.12 |
| 6,466,164 B1 * | 10/2002 | Akopian et al. | 342/357.15 |
| 6,519,466 B2 * | 2/2003 | Pande et al. | 455/456.1 |
| 6,907,346 B2 * | 6/2005 | Teranishi et al. | 701/213 |
| 2002/0116124 A1 * | 8/2002 | Garin et al. | 701/213 |
| 2002/0145560 A1 | 10/2002 | Tsujimoto et al. | |
| 2003/0090413 A1 | 5/2003 | Syrjarinne et al. | |
| 2003/0122708 A1 * | 7/2003 | Percy et al. | 342/357.07 |
| 2003/0137450 A1 * | 7/2003 | Jandrell | 342/357.12 |
| 2004/0203915 A1 * | 10/2004 | van Diggelen et al. | 455/456.1 |

(Continued)

FOREIGN PATENT DOCUMENTS

WO    WO 02/01157 A1    1/2002

OTHER PUBLICATIONS

PCT International Search Report of International Application No. PCT/IB2005/001926, Date of Completion of Search—Oct. 7, 2005.
Search Report of United Kingdom Application No. GB0411394.0, Date of Search—Sep. 15, 2005.

*Primary Examiner*—Thomas H Tarcza
*Assistant Examiner*—Nga X Nguyen
(74) *Attorney, Agent, or Firm*—Locke Lord Bissell & Liddell LLP

(57) ABSTRACT

A satellite positioning device comprising: a timing synchronisation circuit arranged to provide timing data for location estimation. The circuit being arranged to, in a first mode, provide the timing data in dependence on at least one received satellite positioning signal without the assistance of a location estimate and, in a second mode, provide the timing data in dependence on at least one received satellite positioning signal with the assistance of a location estimate, the timing synchronisation circuit being arranged to switch between the first and second modes of operation in dependence on whether the timing synchronisation circuit is providing the timing data.

19 Claims, 5 Drawing Sheets

U.S. PATENT DOCUMENTS

| | | | |
|---|---|---|---|
| 2004/0209625 A1* | 10/2004 | Haddrell | 455/456.1 |
| 2004/0266338 A1* | 12/2004 | Rowitch | 455/7 |
| 2005/0060089 A1* | 3/2005 | Garin et al. | 701/213 |
| 2005/0062643 A1* | 3/2005 | Pande et al. | 342/357.1 |
| 2005/0080561 A1* | 4/2005 | Abraham et al. | 701/213 |
| 2006/0238418 A1* | 10/2006 | Monnerat et al. | 342/357.09 |

* cited by examiner

GPS DEVICE

FIELD OF THE INVENTION

The present invention relates to a satellite positioning system, in particular but not exclusively for use in a communications system for synchronising a location signal in a cellular wireless system.

BACKGROUND OF THE INVENTION

Wireless cellular communication networks and their operation are generally well known. In such a system the area covered by the network is divided into cells. Each cell is provided with a base station, which is arranged to communicate with a plurality of mobile stations or other user equipment in a cell associated with the base station.

In these known systems, it is possible to locate a mobile station with reference to a base station, and therefore possible to locate a mobile station within the operational transmission range of a base station.

As is also known additional location information can be determined by measuring the time between transmission and reception of a signal between a mobile station and a known base station or transmitter. Using such time of arrival (TOA) methods with signals transmitted from base stations it is possible to locate a mobile station within tens of metres.

Using the base station to transmit timing signals and using these signals to determine a location estimate produces an estimate containing several potential errors and problems One of the major problems is the many different paths that the transmissions from the base station to the mobile station can take. The path can be direct, which provides an accurate estimation of the distance between the base and mobile stations or the path can be diffracted or reflected by man-made or natural phenomena such as buildings, large vehicles and hills. These indirect paths do not reflect the true distance between the base station and the mobile station and therefore produce location estimation errors. These diffracted and reflected signal paths occur more frequently in built-up and urban environments, thus degrading the more accurate base station location estimations due to the increased density of base stations.

A separate development in location estimation has been the development of a global positioning satellite (GPS) system which enables a GPS receiver to accurately locate its location within a couple of metres by measuring the time differences between received signals from satellites orbiting the earth. The GPS system relies on both the transmitter (the orbiting satellites) and the receiver to have accurate knowledge of a transmitted timing sequence signal in order that an accurate estimation of the location of the receiver can be made.

As is known in the art the GPS orbiting satellites are accurately synchronised each carrying an accurate very stable atomic clock. Furthermore the constellation of satellites is monitored from controlling ground stations and any timing errors detected are effectively corrected.

As the cost of supplying each GPS receiver with an accurate and stable clock oscillator such as an atomic clock is prohibitive, the typical GPS receiver determines an accurate GPS time sequence by comparing at least four separate GPS timing signals received from at least four different satellites. These satellites are used to both accurately synchronise the receiver clock and to provide an accurate estimation of the location of the signal.

As it is known in the art a timing synchronisation sequence can be carried out by receiving the Time of Week (ToW) signal transmitted by each GPS satellite. The ToW signal is transmitted once per GPS subframe, in other words exactly every six seconds. The detection of the ToW signal is largely dependent on the received strength of the signal, and below a certain threshold it becomes impossible to decode the information bits that go to make up the ToW signal. Additionally, processing the ToW signal takes up a significant amount of processing time which has an adverse impact on power consumption.

The speed of producing an a timing synchronisation sequence (and also therefore location estimation) where the received signal is close to the received strength threshold can be improved in some situations by storing a previously determined location estimate and using this estimate as an a priori value to limit the 'search window' for the timing synchronisation sequence.

These methods rely on time stamping the stored location estimates, and discarding location estimates older than a predefined value. This prevents the timing synchronisation sequence starting its search from an inaccurate location search window.

These methods have a disadvantage when old stored locations are not inaccurate starting locations. The known methods simply discarding the location estimates and require the system to start a fresh timing synchronisation sequence, with its resultant processing and power costs.

SUMMARY OF THE INVENTION

It is an aim of the embodiments of the present invention to address or partially mitigate one or more of the problems discussed previously.

There is provided according to the present invention a satellite positioning device comprising: a timing synchronisation circuit arranged to provide timing data for location estimation, the circuit being arranged to, in a first mode, provide the timing data in dependence on at least one received satellite positioning signal without the assistance of a location estimate and, in a second mode, provide the timing data in dependence on at least one received satellite positioning signal with the assistance of a location estimate, the timing synchronisation circuit being arranged to switch between the first and second modes of operation in dependence on whether the timing synchronisation circuit is providing the timing data.

The timing synchronisation circuit is preferably further arranged to switch from the second mode to the first mode in dependence on whether the timing synchronisation circuit is providing the timing data by a first time period (N).

The timing synchronisation circuit may be further arranged to switch from said first mode to said second mode in dependence on whether the timing synchronisation circuit is providing the timing data by a second time period (M).

The device may further comprise a location estimation circuit arranged to receive the timing data and arranged to output a location estimate in dependence on the timing information.

The location estimator circuit may further comprise a location register.

The location register may comprise random access memory.

The first mode of operation is preferably a GPS timing synchronisation sequence.

The second mode of operation is preferably a location assisted GPS timing synchronisation sequence.

An integrated circuit may comprise a satellite positioning device as described above.

According to a second aspect of the invention there is provided a method for producing timing data in a satellite positioning system comprising a timing synchronisation circuit arranged to provide timing data for location estimation, wherein the method comprises the steps of: receiving the at least one global positioning satellite signal; receiving the at least one location estimate; producing in a first mode timing data in dependence on the at least one satellite positioning signal without the assistance of a location estimate; producing in a second mode timing information in dependence on the at least one satellite positioning signal with the assistance of a location estimate; switching between the modes in dependence on whether the timing synchronisation circuit is providing the timing data.

The step of switching between the modes may comprise switching from the second mode to the first mode in dependence on whether the timing synchronisation circuit is providing the timing data after a first time period (N).

The step of switching between the modes may further comprise switching from the first mode to the second mode in dependence on whether the timing synchronisation circuit is providing the timing data after a second time period (M).

BRIEF DESCRIPTION OF DRAWINGS

For a better understanding of the present invention and how the same may be carried into effect, reference will now be made by way of example only to the accompanying drawings in which.

DETAILED DESCRIPTION OF EMBODIMENTS

Figure 1:
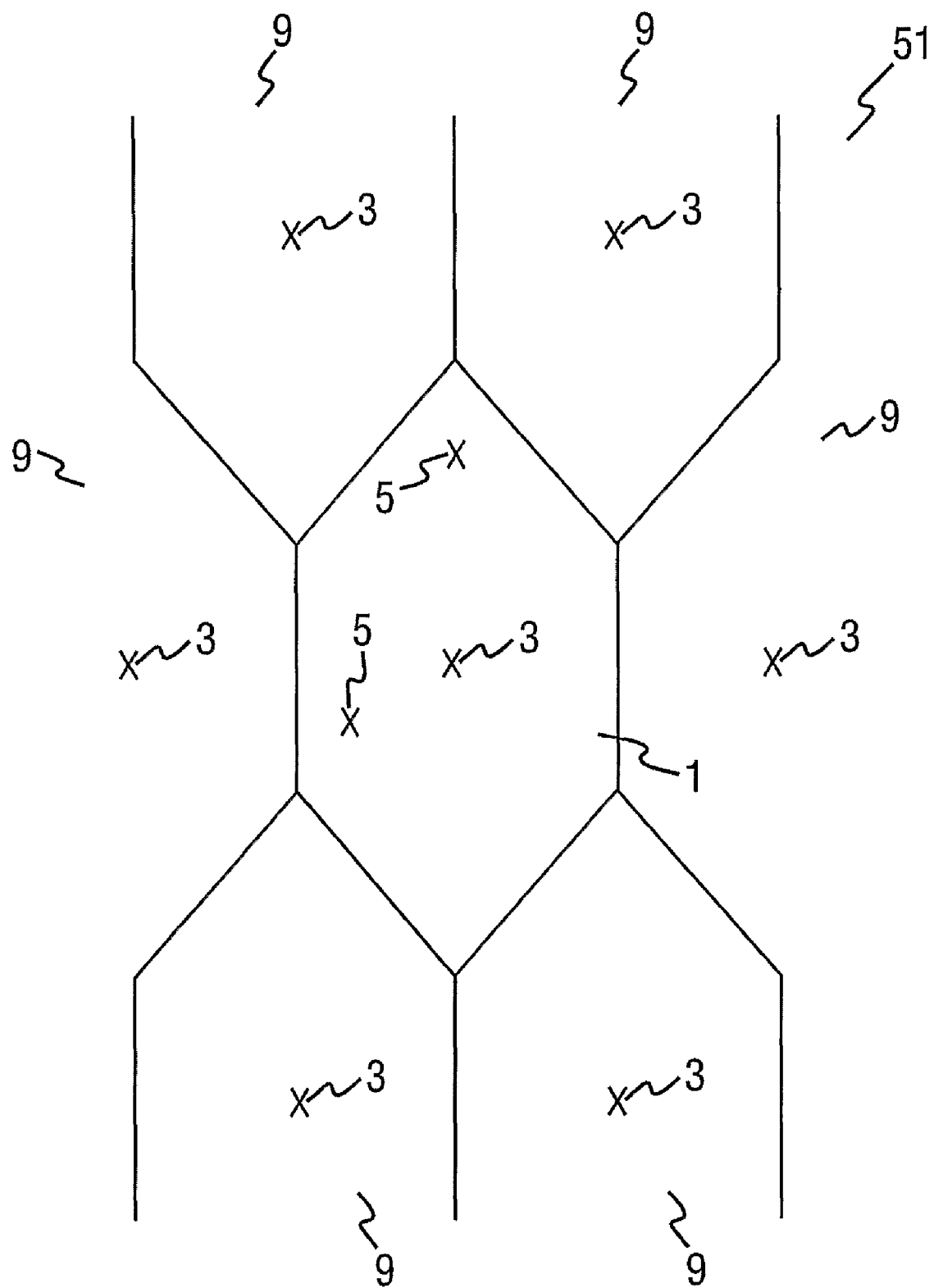
FIG. 1 shows a schematic view of a typical cell layout of a cellular network, in which embodiments of the present invention can be implemented.

Reference is made to FIG. 1, which shows part of a cellular telecommunications network 51 in which embodiments of the present invention can be implemented. The area covered by the network is divided into a plurality of cells 1, 9. FIG. 1 shows a central cell 1 surrounded by six partial cells 9. Further cells bordering these cells are not shown for clarity. Each cell has associated therewith a base transceiver station 3 also known as a base station. The base station 3 is arranged to communicate with mobile devices or other user equipment 5 associated with the base station 3. Examples of mobile devices include mobile telephones, personal digital assistants (PDA) with transceiver capabilities, and laptops with transceiver capabilities. These mobile devices 5 are also known as mobile stations.

The cells may overlap at least partially or totally. In some systems, these cells may have a different shape to that illustrated. In some embodiments the base stations 3 may communicate with mobile devices 5 outside their associated cell. In other embodiments mobile devices 5 may communicate with mobile devices 5 directly and without recourse to the base station 3. In other embodiments of the invention base station 3 may communicate with another base station 3 directly.

Communication between the mobile station 5 and the base station 3 within a cell is synchronised to both the symbols and frames transmitted by the base station 3. As in known in the art the base station 3 derives its timing from a clock accurate and stable to within a fraction of a part per million. The mobile station 5 receives the base station signals and uses the base station signals to synchronise its own internal clock and timings.

As is known in the art, code division multiple access (CDMA) network standards used in the United States are synchronised with the GPS timing sequence, other communication standards such as the global system for mobile communications (GSM) and wideband code division multiple access (WCDMA) do not provide a base station timing synchronised to GPS time, and are therefore considered to be asynchronous with respect to GPS time. Furthermore the base stations and their timing can be considered to be asynchronous to one another.

Figure 2:
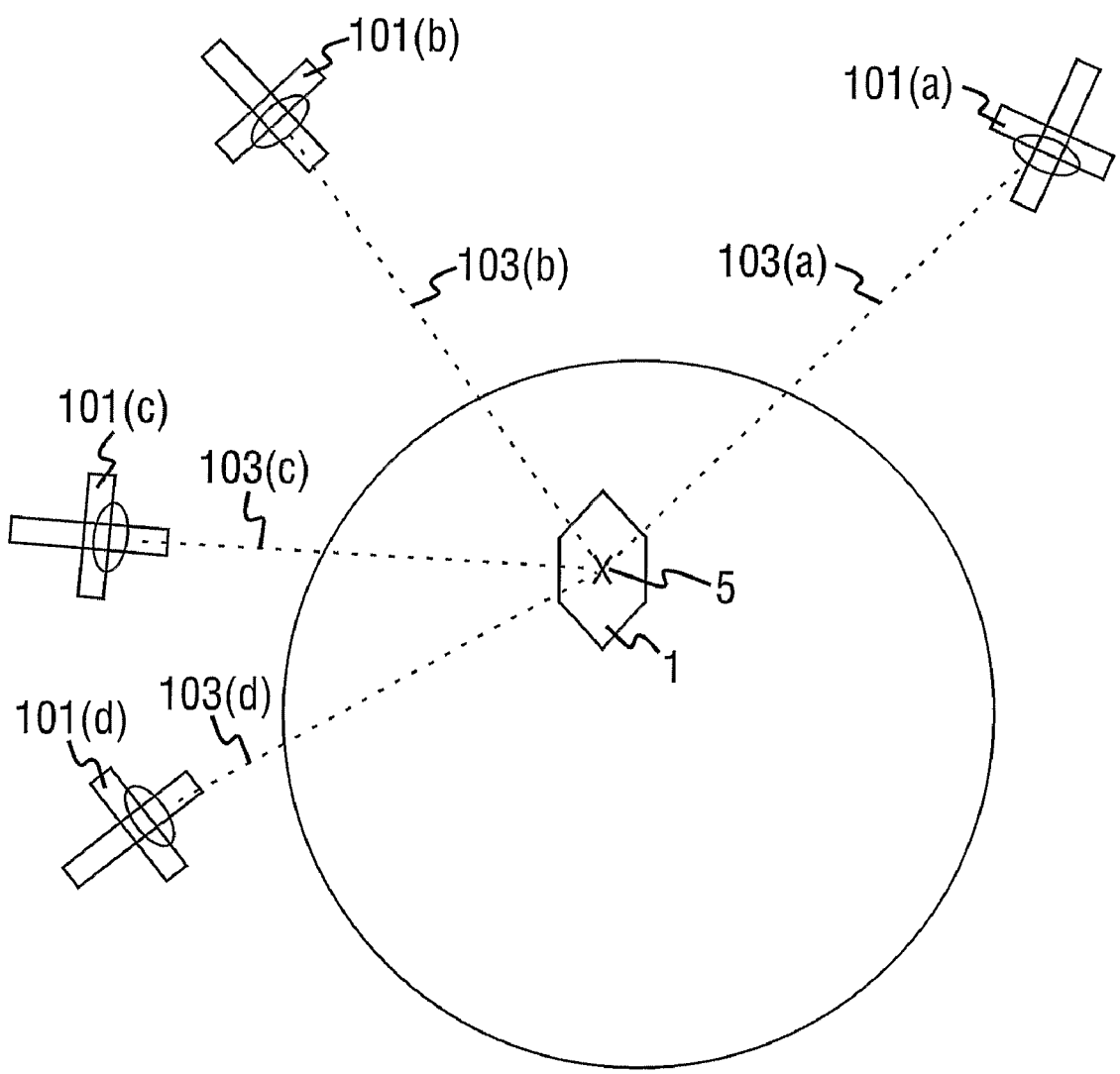
FIG. 2 shows a schematic view of a Global Positional Satellite (GPS) system, in which embodiments of the present invention can be implemented.

FIG. 2 shows a schematic view of a typical GPS system. A GPS receiver or mobile station 5 uses an antenna to receive signals 103 from orbiting satellites 101. In FIG. 2 the mobile station 5 can "see" four of the constellation of orbiting satellites 101(a), 101(b), 101(c), 101(d). Each of the satellites transmits signals 103(a), 103(b), 103(c), 103(d).

These signals are made up of subframes. Each subframe comprises a 50 bit per second data sequence. This 50 bit per second data sequence comprises a known preamble, a Time of Week (ToW), and a Subframe ID. The preamble is a predetermined eight bit identifier at the beginning of every subframe, and a two bit (00) sequence at the end of every subframe, which is the same for all of the satellites. The Time of Week signal is a seventeen bit sequence which accurately defines the time of the start of the current subframe.

In order that this signal is capable of being received at very low power levels and still be extracted from the background noise the data sequence is modulated using a known pseudorandom timing sequence. This pseudorandom sequence also known as the gold code is 1023 bits long and is transmitted at 1.023 Mhz, in other words the code sequence repeats 20 times per data bit.

The location estimate of the mobile station using the typical GPS system is carried out using a process known as triangulation. This process assumes that a time signal stored by the mobile station 5 and the orbiting satellite 101 is accurately synchronised. The pseudorandom timing sequence is transmitted repeatedly from the satellite 101 and received by the mobile station 5. The mobile station 5 then compares the received sequence against the expected sequence in order to determine a timing delay. Using this timing delay and the accurately known location of the satellite, the mobile station estimate prescribes a spherical arc along which the mobile station is estimated to be. It is the combination of these arcs that provide an accurate location estimate. If three satellites can be "seen", providing the estimation system is functioning, the three arcs intersect at two points. If four or more satellites are "seen" then the arcs intersect at a single location—providing a single location estimate in three dimensional space.

Figure 3:
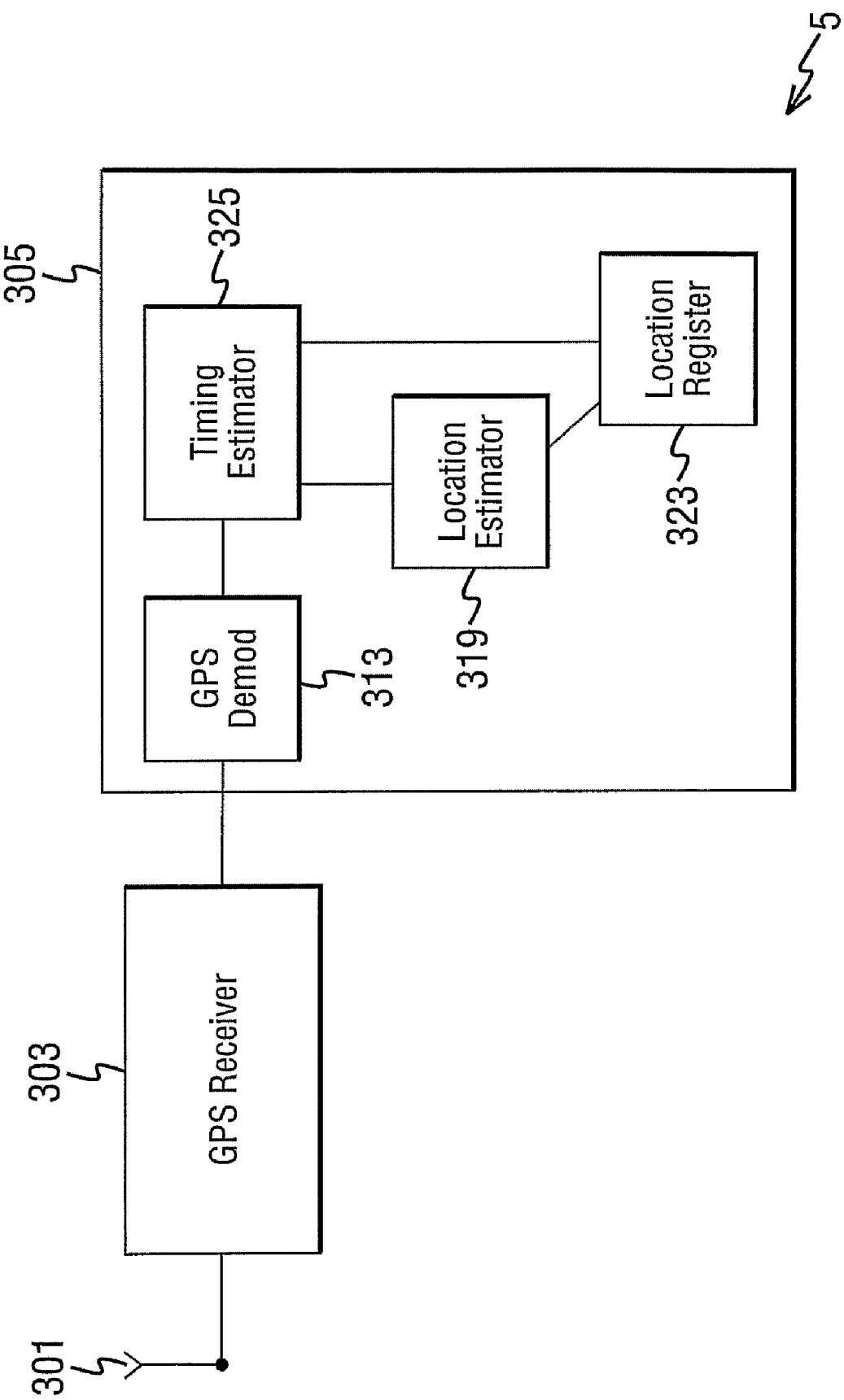
FIG. 3 shows a schematic view of a first embodiment of the present invention incorporated in a mobile station wireless communication transceiver operating within a cellular network as shown in FIG. 1.

FIG. 3 shows a schematic view of a first embodiment of the present invention. The mobile station 5 comprises an antenna 301, a GPS receiver 303, and a cellular transceiver 305.

The antenna 301 is connected to the GPS receiver 303. The GPS receiver 303 is connected to the cellular transceiver 305.

Furthermore the cellular transceiver 305 comprises a GPS demodulator 313, a timing sequence estimator 325, a location estimator 319, and a location register 323.

The GPS demodulator 313 is connected to the GPS receiver. The GPS demodulator 313 is further connected to the timing estimator 325. The timing estimator 325 is connected to the location estimator 319. The timing estimator is further connected to the location register 323. The location estimator 319 is further connected to the location register 323.

Further embodiments can store a location value in a Random Access Memory (RAM) instead of a location register 323. Further embodiments of the invention may implement the functionality of the described components of the system within a processor unit and associated memory storing data and functional element instructions.

Mobile station 5 can further comprise other components in order that it performs its purpose as a mobile communications station. The components not directly concerned with the embodiment of the present invention as described are not marked in FIG. 3 nor described below.

The antenna 301 comprises a multi-bandwidth transceiver antenna, capable of receiving and transmitting cellular network frequency components, and receiving GPS signals transmitted by satellites 101. These received signals are passed to the GPS receiver 303. These received signals are also passed to the cellular transceiver 305 via the GPS receiver 303.

In further embodiments more than one antenna is used to receive the GPS and cellular signals. Further embodiments can have one or more antennas connected to the cellular receiver 305 and one or more antennas connected to the GPS receiver 303. Further in some embodiments at least one antenna is only connected to the cellular transceiver 305 and at least one antenna is only connected to the GPS receiver 303.

The GPS receiver 303 receives GPS radio frequency signal components, and outputs GPS data to the cellular transceiver 305 via the interconnect 309. In a first embodiment of the present invention the GPS data output to the cellular transceiver 305 are the received GPS signals. In other embodiments of the present invention a sample of the GPS signal is output to the cellular transceiver 305 from which timing information can be derived.

The GPS demodulator 313 within the cellular transceiver 305 receives the GPS data output by the GPS receiver and demodulates this data to produce the data stream used by the timing estimator 325 to produce an accurate local timing value. Using only the GPS data to produce an accurate local timing value is known as a normal GPS timing synchronisation sequence.

The GPS timing estimator 325 further receives from the location register 323 a stored location estimate. Using both the GPS data and the stored location estimate the GPS timing estimator 325 is able to carry out a timing synchronisation sequence using the stored location estimate as an a priori search window starting location. The use of this a priori estimate, where the location is accurate provides a quicker and less power consuming timing synchronisation sequence than could otherwise be carried out. This use of the location estimate is also known as a location assisted timing synchronisation sequence.

Figure 4:
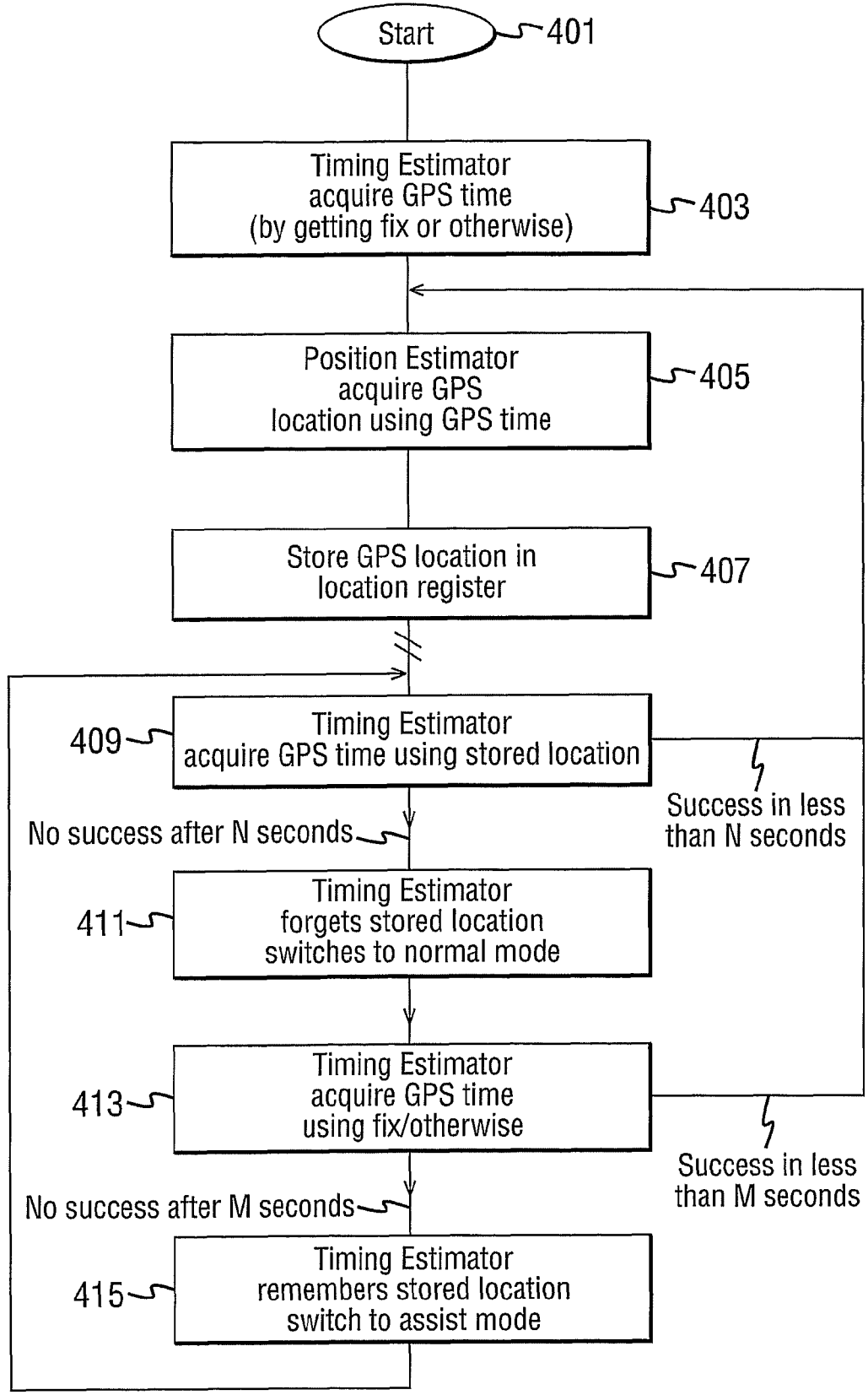
FIG. 4 shows a flow diagram view of the method used in the first embodiment of the present invention as shown in FIG. 3.

With reference to FIG. 4 the method as used in a first embodiment of the present invention is shown.

The start step 401 is where the cellular transceiver 305 and GPS receiver 303 performs a power up or reset. The timing estimator 325 in step 403 performs a normal timing synchronisation sequence using only the GPS data. This sequence synchronises the mobile station time to the GPS time using a method known in the art.

The GPS timing value, obtained from the timing synchronisation sequence, and the received GPS timing signals are passed to the location estimator 319 in step 405. Using the derived accurate GPS timing value and triangulation the location from the individual received GPS timing signals the location estimate of the GPS receiver can be calculated.

The GPS receiver location estimate is then stored in step 407 in the location register 323.

At some later time, in step 409, the mobile station 5 GPS receiver attempts to refresh the estimated GPS time. Using the location assisted GPS timing synchronisation sequence methods known in the art the timing estimator 325 attempts to produce a synchronised GPS timing value.

If the location assisted GPS timing synchronisation sequence is successful before the expiry of a first predetermined time period (N seconds) the method passes to step 405 and the new GPS timing value can be used by the location estimator 319 to produce a new location estimate.

If after the expiry of a first predetermined time period (N seconds) the stored location assisted GPS timing synchronisation sequence has not produced a new GPS timing value, for example the current GPS receiver location is significantly different from the stored GPS receiver location, the method passes to step 411.

In step 411, the timing estimator 325 'forgets' the stored location value. In other words the timing estimator switches from location assisted GPS timing synchronisation sequence mode of operation to normal GPS timing synchronisation sequence mode.

In step 413, the timing estimator 325 in normal GPS timing synchronisation sequence mode performs a GPS timing estimation using a known GPS signal only method. Such methods apply a much greater 'search window' and will usually find the GPS timing information where the stored location value is incorrect.

If the normal GPS timing synchronisation sequence is successful within a second predetermined time period (M seconds) the method passes to step 405 and the new GPS timing value can be used by the location estimator 319 to produce a new location estimate.

If after the second predetermined time period (M seconds) has expired and the normal GPS timing synchronisation sequence has not produced a new GPS timing value, for example the current GPS receiver strength is too low to achieve a full lock, the method passes to step 415.

In step 415 the timing estimator 325 'remembers' the 'forgotten' stored location in the location register 323. In other words the timing estimator 325 switches from a normal GPS timing synchronisation sequence mode of operation to a location assisted GPS timing synchronisation sequence mode. The method then passes to step 409, where the timing estimator 325 performs a location assisted GPS timing synchronisation sequence.

The iterative process of stored location assisted GPS timing synchronisation sequence and normal GPS timing synchronisation sequence continues until a timing estimate has been reached. For example where a GPS receiver is in an indoor environment and the stored location is close to the current location the signal strength may be stronger on a second iteration of the stored location estimation and a timing value calculated at this time.

Figure 5:
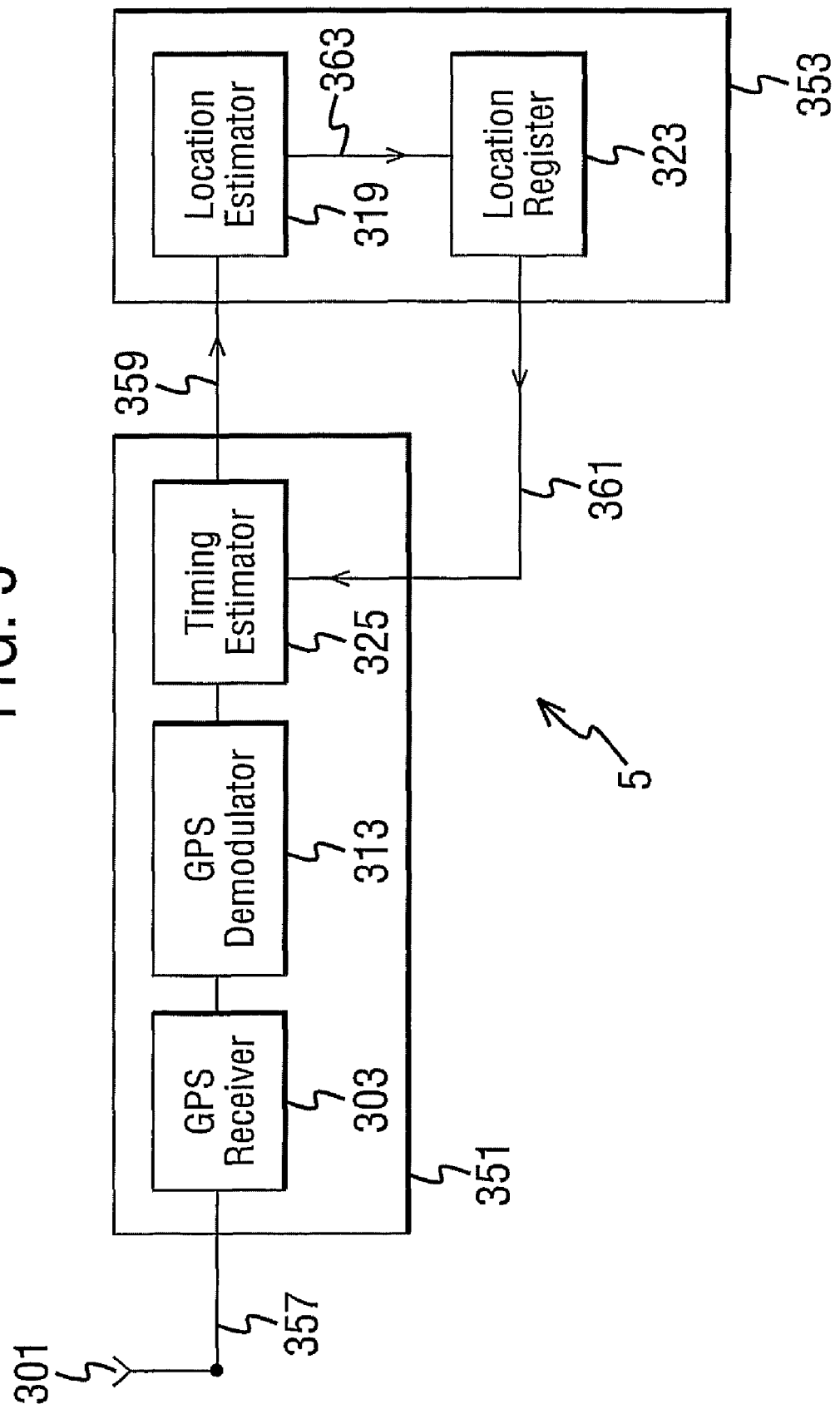
FIG. 5 shows a schematic view of a second embodiment of the present invention.

With reference to FIG. 5 a second embodiment of the present invention is described. The mobile station 5 comprises an antenna 301, a GPS receiver 351, and a cellular transceiver 353.

The antenna 301 is connected to the GPS receiver 351. The GPS receiver 351 is connected to the cellular transceiver 353. In one embodiment of the present invention signals pass between the GPS receiver 351 and the cellular transceiver 353.

The GPS receiver 351 comprises a GPS signal receiver 303, a GPS demodulator 313 and a timing estimator 325. The GPS signal receiver 303 has an input connected to the antenna 301 and an output connected to the GPS demodulator 313 input. The GPS demodulator 313 output is connected to a first input of the timing estimator 325. The timing estimator 325 has a first input/output connected to the cellular transceiver 353 location estimator 319 and a second input/output connected to the cellular transceiver 353 location register 323.

The GPS signal receiver 303 receives signals from the antenna 301, filters the received signals to output a signal to the GPS demodulator 313. The GPS demodulator 313 then performs demodulation on the GPS signals to extract the timing data and the information data stored in the GPS signal. This timing and information data is then passed to the timing estimator 325. The timing estimator 325 passes the timing information to the cellular transceiver 353 location estimator 319 and receives a stored location value from the cellular receiver 353 location register 323.

This embodiment of the present invention therefore differs from the first embodiment of the present invention in that the GPS demodulation and timing estimation functions are not embedded within the cellular transceiver system and the cellular transceiver system is therefore provided with demodulated timing and data signals.

In all other respects the second embodiment of the present invention functions in a manner similar to the earlier described embodiment.

In both embodiments as described above location information is therefore not simply discarded after a predefined period and therefore the frequency of performing normal timing synchronisation sequence can be significantly reduced.

In some embodiments of the present invention the first and second time periods are fixed within the timing estimator. In other embodiments of the present invention the first and second time periods are variable and adjustable dependent on the environmental conditions the mobile station is operating within. For example the timing periods may vary when the mobile station is largely indoors from when the mobile station is travelling in a fast moving vehicle.

Whilst the above has been described for example in relation to a GPS receiver system embedded within a cellular telecommunications system, such a GPS receiver comprising signal receiver, demodulator, timing estimator, location estimator and location register, could operate separate from said transceiver system.

In further embodiments of the present invention the GPS receiver comprising signal receiver, demodulator, timing estimator, location estimator and location register can be embedded within any system requiring location estimation information.

The invention claimed is:

1. A device comprising:
a timing estimator configured to provide timing data to a location estimator, the timing estimator being arranged to, in a first mode, provide the timing data in dependence on at least one received satellite positioning signal without the assistance of a previous location estimate and, in a second mode, provide the timing data in dependence on at least one received satellite positioning signal with the assistance of a previous location estimate,
the timing estimator being configured to switch from the second mode to the first mode when the location estimator is not able to provide a location estimation based on the timing data with the assistance of the previous location estimate.

2. A device as claimed in claim 1 wherein the timing estimator is further configured to switch from the second mode to the first mode in dependence on whether the timing estimator is providing the timing data by a first time period.

3. A device as claimed in claim 1, wherein the timing estimator is further configured to switch from said first mode to said second mode in dependence on whether the timing estimator is providing the timing data by a second time period.

4. A device as claimed in claim 1, further comprising the location estimator configured to receive the timing data and arranged to output a location estimate in dependence on the timing information.

5. A device as claimed in claim 4 wherein the location estimator further comprises a location register.

6. A device as claimed in claim 5 wherein the location register comprises random access memory.

7. A device as claimed in claim 1 wherein the first mode of operation is a GPS timing synchronization sequence.

8. A device as claimed in claim 1 wherein the second mode of operation is a location assisted GPS timing synchronization sequence.

9. A device according to claim 1 wherein the device is a mobile station comprising an antenna, a global positioning satellite receiver and a cellular transceiver.

10. A method comprising:
receiving at least one global positioning satellite signal;
receiving a previous location estimate;
determining to produce in a first mode timing data in dependence on the at least one satellite positioning signal without the assistance of the previous location estimate;
determining to produce in a second mode timing information in dependence on the at least one satellite positioning signal with the assistance of a previous location estimate;
determining to switch from the second mode to the first mode when location estimation is not possible based on the timing data with assistance of the previous location estimate.

11. A method as claimed in claim 10, wherein the determining to switch between the modes comprises determining to switch from the second mode to the first mode in dependence on whether a timing estimator is providing the timing data after a first time period.

12. A method as claimed in claim 10, wherein the determining to switch between the modes further comprises determining to switch from the first mode to the second mode in dependence on whether a timing estimator is providing the timing data after a second time period.

13. A method according to claim 10, further comprising a location estimator receiving the timing data and outputting a location estimate in dependence on the timing information.

14. A method according to claim 13, wherein the location estimator further comprises a location register.

15. A method according to claim 14, wherein the location register comprises random access memory.

16. A method according to claim 10, wherein the first mode of operation is a GPS timing synchronization sequence.

17. A method according to claim 10, wherein the second mode of operation is a location assisted GPS timing synchronization sequence.

18. An article of manufacture comprising: a computer readable storage medium containing computer executable instructions which when executed by a processor, causes a device to perform a method comprising:
   receiving at least one global positioning satellite signal;
   receiving a previous location estimate;
   determining to produce in a first mode timing data in dependence on the at least one satellite positioning signal without the assistance of the previous location estimate;
   determining to produce in a second mode timing information in dependence on the at least one satellite positioning signal with the assistance of a previous location estimate; and
   determining to switch from the second mode to the first mode when a location estimation is not possible based on the timing data with assistance of the previous location estimate.

19. A device comprising:
   a timing estimation means for providing timing data to a location estimation means, the timing estimation means being configured to, in a first mode, provide the timing data in dependence on at least one received satellite positioning signal without the assistance of a previous location estimate and, in a second mode, provide the timing data in dependence on at least one received satellite positioning signal with the assistance of a previous location estimate;
   the location estimation means receiving the timing data and outputting a location estimate in dependence on the timing data,
   wherein the timing estimation means switches from the second mode to the first mode when the location estimation means in the second mode is not able to provide a location estimation based on the timing data with the assistance of the previous location estimate.

* * * * *